United States Patent [19]

Thieme

[11] Patent Number: 4,616,778
[45] Date of Patent: Oct. 14, 1986

[54] THERMOSTATIC STEAM TRAP
[75] Inventor: Horst R. Thieme, Harleysville, Pa.
[73] Assignee: YWHC, Inc., Wilmington, Del.
[21] Appl. No.: 773,449
[22] Filed: Sep. 6, 1985

Related U.S. Application Data

[63] Continuation-in-part of Ser. No. 632,508, Jul. 19, 1984, abandoned.

[51] Int. Cl.⁴ ............................................... F16T 1/02
[52] U.S. Cl. ............................................ 236/58; 236/93 A
[58] Field of Search ........................ 236/56, 58, 93 A

[56] References Cited

U.S. PATENT DOCUMENTS

| | | | |
|---|---|---|---|
| 1,792,891 | 2/1931 | Clifford | 236/93 A X |
| 1,929,684 | 10/1933 | Fernald | 236/58 |
| 2,628,783 | 2/1953 | Fernald | 236/58 |
| 2,914,251 | 11/1959 | Morgan | 236/56 |
| 3,489,349 | 1/1970 | Hilmer et al. | 236/58 |
| 3,625,422 | 12/1971 | Johnson | 236/58 |
| 3,756,681 | 9/1973 | Croston | 312/351 |

Primary Examiner—William E. Wayner
Attorney, Agent, or Firm—John W. Logan, Jr.

[57] ABSTRACT

A thermostatic steam trap is disclosed in which a control chamber contains an insert enclosing a bellows adapted to force a valve member to a closed position in a direction opposite the normal flow of fluid through the trap together with self-centering means to center and align the valve member with respect to the valve seat.

3 Claims, 3 Drawing Figures

THERMOSTATIC STEAM TRAP

This application is a continuation-in-part of my co-pending application Ser. No. 632,508, filed July 19, 1984, now abandoned.

BACKGROUND OF THE INVENTION

The present invention relates to stream traps, and more particularly, to thermostatic steam traps.

Thermostatic steam traps are known for draining condensate from steam lines. Examples of such traps are disclosed in the following U.S. patents:

U.S. Pat. No. 1,037,228, J. L. Fitts, Sept. 3, 1912
U.S. Pat. No. 2,629,553, A. K. Veland, Feb. 24, 1953
U.S. Pat. No. 2,781,173, A. Bahr, Feb. 12, 1957
U.S. Pat. No. 3,042,363, D. B. Deeks, July 3, 1962
U.S. Pat. No. 3,169,704, U. Domm et al, Feb. 16, 1965
U.S. Pat. No. 3,344,672, J. S. Lingnau, Oct. 3, 1967
U.S. Pat. No. 3,362,636, Sentaro Miyawaki, Jan. 9, 1968
U.S. Pat. No. 3,620,449, G. Hohn et al, Nov. 16, 1971

Although the aforementioned patented steam traps may operate satisfactorily, not all fail in the open position. Moreover, none are as compact, simple and inexpensive in construction and operation as is desirable and include easily replaceable operating parts.

In light of the foregoing, it is a primary object of the present invention to provide an imporved stream trap of the thermostatic variety.

Another object of the present invention is to provide a thermostatic steam trap which fails in the open position so as to allow continued draining of condensate and ready detection.

A further object of the present invention is to provide a thermostatic steam trap which adequately drains condensate yet closes at a temperature which closely follows the steam saturation curve to allow the trap to operate over a wide range of pressure without expensive steam loss.

An even further object of the present invention is to provide a thermostatic steam trap which is simple and compact in design and construction.

SUMMARY OF THE INVENTION

More specifically, in the present invention there is provided a thermostatic steam trap having an insert assembly which includes an annular member with a valve seat surrounding a valve member which seats in a direction opposite the normal fluid flow through the trap. The upper end of the valve member is attached to a cup-shaped cage containing a thermally responsive bellows. Movement of the cage in the downward direction is impeded by a plurality of downward protuberances in contact with the above-mentioned annular member. An increase in the temperature of the fluid flowing through the trap actuates the bellows to expand upward pulling the cage and the attached valve member into a seated position, thus blocking the fluid flow into the outlet passage. The thermostatic steam trap self-centers its valve member by way of legs on the bellows assembly and a pair of contour plates which pivot upon one another. The result is a steam trap which is simple in operation and requires less service.

DESCRIPTION OF THE DRAWINGS

The operation, features and advantages of the present invention should become apparent from the following description when taken in conjunction with the accompanying drawings, in which.

DETAILED DESCRIPTION OF THE INVENTION

Figure 1:
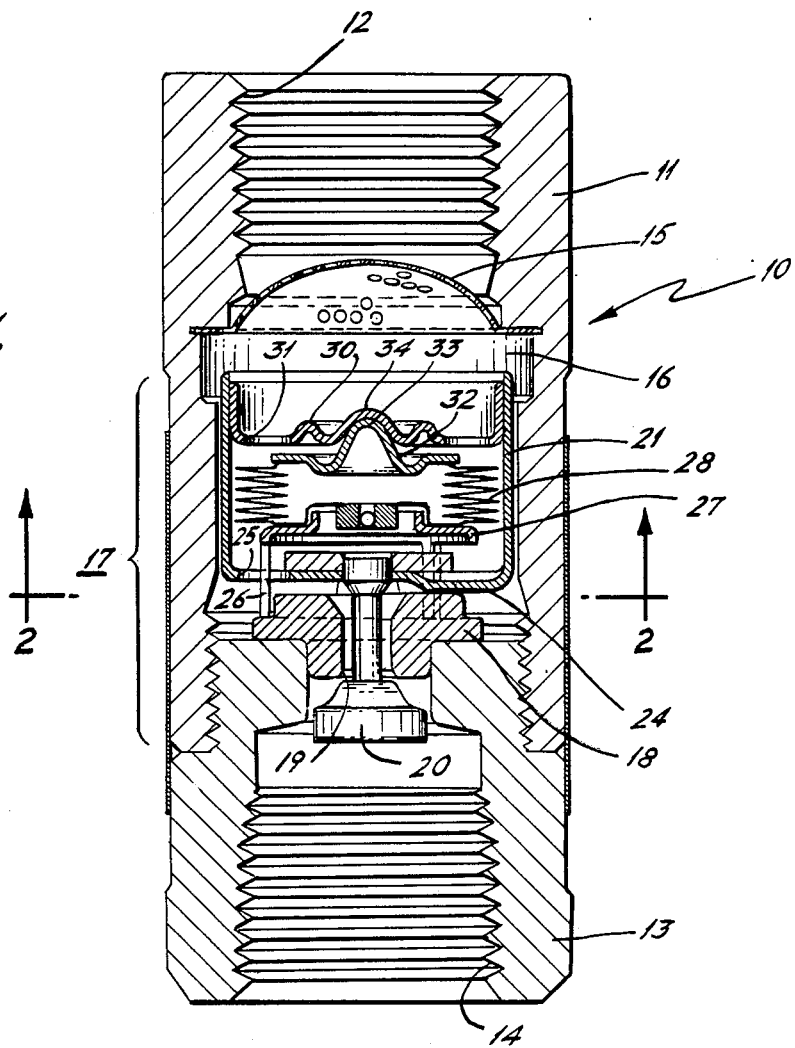
FIG. 1 is an enlarged sectional view of a thermostatic steam trap embodying the present invention.
Figure 2:
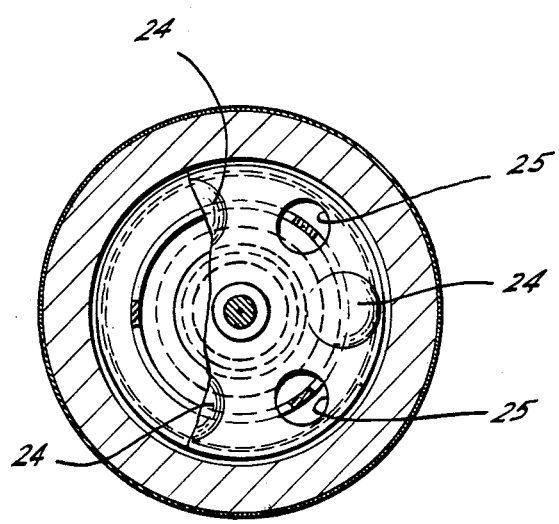
FIG. 2 is a sectional view taken along line 2—2 of FIG. 1.

Referring to the drawings, there is illustrated in FIGS. 1 and 2 a thermostatic steam trap 10. As may be seen therein, the steam trap 10 has a trap body member 11 having an internally threaded inlet 12 adapted to be connected to a pressurized steam line (not shown) from which condensate is to be drained, and is internally threaded at the opposite end to connect to an outlet fitting 13 with an internally threaded outlet 14 adapted to be connected to a condensate sump line (not shown). A strainer 15 is positioned at the pressurized steam line end of the trap body member 11 separating the inlet 12 from a control chamber 16, the longitudinal center line of which is disposed coaxially with the longitudinal center lines of the inlet 12 and outlet 14.

The control chamber 16 contains an insert assembly 17 which includes an annular member 18 providing a valve seat 19 which completely surrounds the valve member 20. A cup-shaped cage 21, which has affixed to its downward face the valve member 20, is also provided as part of the insert assembly. Three circular downward protuberances 24 are provided on the downward face of the cup, each equally spaced from the base of the affixed valve member 20 and from one another. Three uniform circular holes 25 are formed in the downward cup face, each equally spaced from one another and equally spaced from the protuberances 24. Legs 26, formed on a bellows support member 27, project downwardly, one through each of the holes 25, into engagement with the annular member 18 to maintain a bellows 28 at a predetermined location in the control chamber 16. A perforated top plate 30, having a series of openings 31, is secured, such as by welding, to the top of the cage 21. Thus, the bellows is loosely contained within the cage. Pivot means is provided between the bellows and the top plate, which, together with the legs 26, permits the valve member 20 to be self-centering when pulled to its closed position. This pivot means may include a contoured pivot plate 32 at the upper end of the bellows and having an upward central projection 33 engaged within an upward recess 34 in the center of the top plate 30. Alternatively, the pivot plate could have an upwardly facing recess engaged by a downwardly extending projection on the top plate.

In the illustrated embodiment, the bellows 28 contains a small quantity of fluid which has a somewhat lower vaproizing point than that of water, for example, alcohol. When the temperature in the control chamber is below the vaporization point of the bellows fluid, which will occur when condensate is present in the trap, the bellows 28 will be in its closed or contracted condition, thereby permitting the valve to open and discharge the condensate.

The pressure differential between the control chamber 16 and the outlet passage 14 will cause the valve member 20 to be displaced axially away from the valve seat 19, thus allowing the condensate to drain from the control chamber into the outlet passage 14 and into the condensate sump line. As the temperature begins to approach the heat of vaporization for the bellows fluid, the fluid will begin to vaporize with a corresponding expansion in the bellows 28. The legs 26, which, in the pressurized system, contact the annular member 18, prevent downward expansion of the bellows 28. Accordingly, the bellows 28 will expand axially upward or in a direction away from the valve seat with a corresponding upward movement of the pivot plate 32, which displaces the top plate 30 and the attached cage 21 axially upward. The valve member 20, attached to the cage 21, thus begins to close on the valve seat member 19, resulting in a decrease in the discharge of condensate. When the temperature nears the desired closing temperature, the bellows fluid should be at or approaching a completely vaporized state with the bellows 28 near full expansion, the pressure differential between the control chamber 16 and the outlet passage 14 being sufficient to prevent the valve member 20 from seating on the valve seat 19, thus continuing to permit the discharge of condensate. Finally, when the temperature approaches the design closing temperature, the vapor pressure in the bellows 28 is great enough to overcome the pressure difference maintaining the valve member in an unseated position, fully expanding the bellows 28, displacing the cage 21 fully axially upward and seating the valve member 20 against the valve seat 19, thus stopping any discharge through the steam trap. As the system cools, the process reverses itself, again allowing the discharge of condensate.

Because of the difference in vapor pressure relationship between water and alcohol in the bellows, operation of the bellows would tend to cause the trap to operate increasingly below the steam saturation curve with increasing pressure. However, in the steam trap of the present invention, there is a pressure imbalance on the valve member tending to maintain the valve in the open position. The pressure imbalance is equal to the difference between the upstream and downstream pressures times the area of the valve seat opening. This imbalance in pressure will thus resist closing and aid in opening of the trap against the normal forces of the bellows. By careful sizing of the valve seat opening and/or changes in the type of alcohol, operation of the trap can be designed to closely follow the steam saturation curve, preventing undue steam loss, while permitting the maximum condensate discharge.

The head of the valve member 20 should be of a flanged, bell-shaped construction with a larger total diameter than that of the opening in the annular member 18 which provides the valve seat 19. In the closed position, only a portion of the surface area of the head of the valve member 20 will be exposed to the interior of the control chamber 16. Immediately downstream from the valve seat 19 is a cylindrical recess in the outlet passage 14 of a smaller diameter than the diameter of the outlet passage 14. The head of the valve member 20 is adapted to fit and operate within this recess. Whenever the valve member 20 is displaced from the valve seat 19, the condensate is discharged against the entire upper surface area of the head of the valve member 20. The exposure of high pressure condensate to the flanged upper surface of the valve member 20 causes the valve member 20 to move rapidly away from the valve seat 19. The resulting controlled thermodynamic "blast" discharge not only quickly drains condensate, but also avoids "wire drawing" —the common slow initial discharge characteristic of other thermostatic steam traps —which, over time, can wear and deform a valve member and valve seat.

The legs 26, the upward projection 33 of the pivot plate 32 and the downwardly facing indentation 34 of the top plate 30 all serve to center the cage 21 and properly align the valve member 20.

The invention has the advantage of failing in an open position (upon bellows failure), thus allowing continued discharge of condensate and ready detection of trap failure, since the loss of bellows fluid will collapse the bellows 28 and accordingly open the valve member 20. It has the further advantage of operating very efficiently by closely approximating the saturation curve for steam. Moreover, the device is relatively simple and inexpensive.

Figure 3:
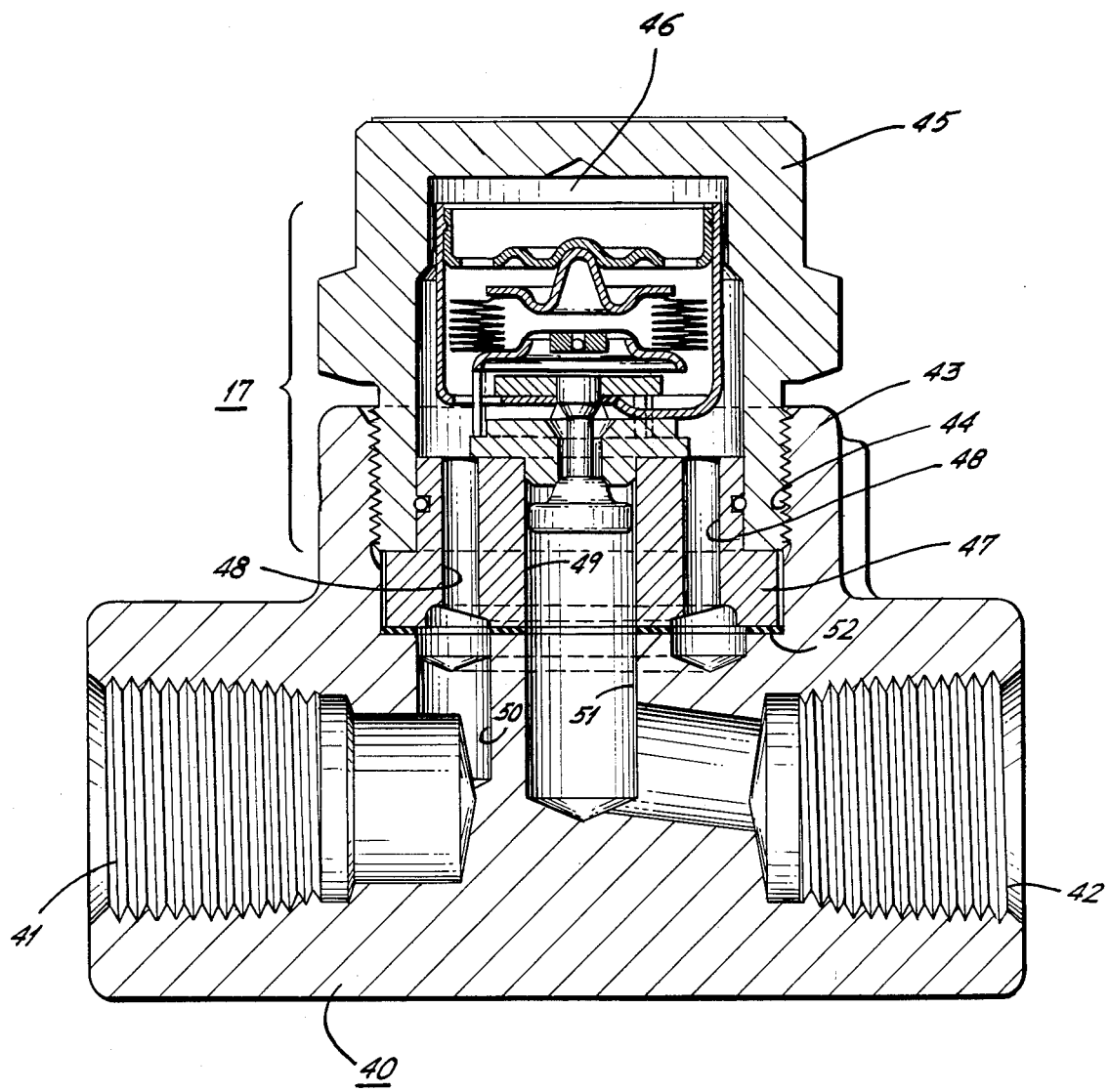
FIG. 3 is an enlarged sectional view of a modified version of the thermostatic steam trap.

FIG. 3 shows a modified form of steam trap embodying the invention of the apparatus shown in FIGS. 1 and 2. This steam trap includes a body member 40 having an inlet opening 41 at one end thereof and an outlet opening 42 at the opposite end thereof. In addition, an upwardly extending boss 43 is provided on the steam trap which, in turn, has a generally cylindrical threaded recess 44. A bonnet 45 is provided which may be threaded into the recess 44 forming a control chamber 46.

Positioned within the recess 44 beneath the bonnet 45 is an adapter plug 47. Inlet and outlet passages 48 and 49 respectively, are provided in the adapter plug which, in turn, communicate with inlet and outlet passages 50 and 51, respectively, in the body member 40, providing fluid communication from the inlet opening 41 through the body portion and adapter to the control chamber and then to the outlet opening 42. When the bonnet is fully inserted into the cylindrical recess 44 of the body portion, it engages against the adapter and forces the adapter tightly against seal means 52, providing a fluid-tight seal between the inlet and outlet passages.

Positioned within the control chamber 46 and secured to the adapter 47, for example by a force fit, is an insert assembly 17 which preferably is a duplicate of the insert assembly 17 of the embodiment of FIGS. 1 and 2. The insert assembly of FIG. 3 operates in exactly the same manner and performs exactly the same function as the insert assembly of the embodiment of FIGS. 1 and 2. When condensate is present at the control chamber 46, the bellows contracts permitting condensate to pass through the steam trap. Similarly, as the temperature in the control chamber is increased by the presence of steam in the control chamber, the bellows expands causing the valve carried by the insert assembly to close.

While particular embodiments of the present invention have been illustrated and described herein, it is not intended to limit the invention to such a disclosure, and changes and modifications may be incorporated and embodied therein within the scope of the following claims.

What is claimed is:

1. A thermostatic steam trap comprising:
  a body member; and
  an insert assembly;
  said body member having an inlet passage at one end thereof, an outlet passage at the other end thereof and means forming a control chamber intermediate the inlet and outlet passages;
  said insert assembly positioned with the control chamber and including an annular member having a central opening forming a valve seat facing toward the outlet passage, a cage freely movable within the control chamber, a valve member fixed to the cage and adapted to be pulled toward the valve seat upon movement of the cage in a direction away from said annular member, said valve member having a head adapted to operate in conjunction with the walls of the outlet passage to cause rapid movement of the valve member away from the valve seat upon displacement of said valve member from said valve seat, expandable and contractable thermostatic means within said cage, means extending through said cage in engagement with said thermostatic means and said annular member whereby expansion of said thermostatic means will move said cage in a direction away from said annular member, and centering means to center said cage and valve member with respect to said valve seat when said thermostatic means is fully expanded;

said inlet passage, outlet passage and control chamber are longitudinally aligned along a common longitudinal axis, and said annular member forming said valve seat is coaxial with said longitudinal axis and adjacent said outlet passage;

said valve member includes a stem portion extending through said seat opening and secured to said cage;

said thermostatic means is a temperature-responsive bellows containing a fluid having a temperature of vaporization less than the temperature of vaporization of water and is expandable and contractable with temperature changes in a direction toward and away from said valve seat;

said cage is of generally cylindrical shape, having a first end adjacent said annular member and a second end facing in the opposite direction, said first end having a series of equally spaced protuberances adapted to engage said annular member to limit movement of said cage within said control chamber in a direction toward said annular member.

2. Apparatus in accordance with claim 1 in which said first end of said cage has a series of openings formed therein, and a series of legs with one leg extending through each of said openings, said legs being formed as part of bellows member supporting the bellows within the cage and, upon expansion of said bellows, adapted to bear against said annular member, and a pivot plate intermediate said bellows and the second end portion of said cage, said pivot plate and said legs serving to center said cage and said valve member relative to said valve seat when said bellows is in its fully expanded condition.

3. A thermostatic steam trap comprising:
a body member; and
an insert assembly;
said body member having an inlet passage at one end thereof, an outlet passage at the other end thereof and means forming a control chamber intermediate the inlet and outlet passages;

said insert assembly positioned within the control chamber and including an annular member having a central opening forming a valve seat facing toward the outlet passage, a cage freely movable within the control chamber, a valve member fixed to the cage and adapted to be pulled toward the valve seat upon movement of the cage in a direction away from said annular member, said valve member having a head adapted to operate in conjunction with the walls of the outlet passage to cause rapid movement of the valve member away from the valve seat upon displacement of said valve member from said valve seat, expandable and contractable thermostatic means said cage, means extending through said cage in engagement with said thermostatic means and said annular member whereby expansion of said thermostatic means will move said cage in a direction away from said annular member, and centering means to center said cage and valve member with respect to said valve seat when said thermostatic means is fully expanded;

said inlet passage, outlet passage and control chamber are longitudinally aligned along a common longitudinal axis, and said annular member forming said valve seat is coaxial with said longitudinal axis and adjacent said outlet passage;

said valve member includes a stem portion extending through said valve seat opening and secured to said cage;

said thermostatic means is a temperature-responsive bellows containing a fluid having a temperature of vaporization less than the temperature of vaporization of water and is expandable and contractable with temperature changes in a direction toward and away from said valve seat;

said cage is of generally cylindrical shape, having a first end adjacent said annular member and a second end facing in the opposite direction, said first end having a series of equally spaced protuberances adapted to engage said annular member to limit movement of said cage within said control chamber in a direction toward said annular member;

said first end of said cage has series of openings formed therein, and a series of legs with one leg extending through each of said openings, said legs being formed as part of a bellows member supporting the bellows within the cage and, upon expansion of said bellows, adapted to bear against said annular member, and a pivot plate intermediate said bellows and the second end portion of said cage, said pivot plate and said legs serving to ceter said cage and said valve member relative to said valve seat when said bellows is in its fully expanded condition.

* * * * *

UNITED STATES PATENT AND TRADEMARK OFFICE
CERTIFICATE OF CORRECTION

PATENT NO. : 4,616,778

DATED : October 14, 1986

INVENTOR(S) : Horst R. Thieme

It is certified that error appears in the above-identified patent and that said Letters Patent is hereby corrected as shown below:

Column 1, line 29: "imporved" should be --improved--

Column 5, line 27: before "seat" insert --valve--

Column 6, line 16: before "said" insert --within--

Column 6, line 47: before "series" insert --a--

Column 6, line 55: change "ceter" to --center--

Signed and Sealed this

Thirteenth Day of January, 1987

Attest:

DONALD J. QUIGG

Attesting Officer

Commissioner of Patents and Trademarks